United States Patent Office 2,991,270
Patented July 4, 1961

2,991,270
PLASTIC COMPOSITION COMPRISING A BLEND OF AN ELASTOMER AND A CERTAIN TERNARY COPOLYMER AND METHOD OF MAKING SAME
Alec Norman Roper, Eccles, Manchester, Ernest Seijo, Sale, and Wolfgang Gersen Barb, Surbiton, England, assignors to Shell Oil Company, a corporation of Delaware
No Drawing. Filed Apr. 12, 1957, Ser. No. 652,360
Claims priority, application Great Britain Apr. 16, 1956
10 Claims. (Cl. 260—45.5)

This invention relates to improved plastic compositions. More particularly, the invention relates to tough plastic compositions of the kind comprising diolefin-acrylic nitrile copolymers.

Specifically, the invention provides improved plastic compositions comprising a blend of 10 to 40 parts of an elastomer comprising a diolefin-acrylic nitrile copolymer with 60 to 90 parts of a ternary copolymer of (a) an alkenyl-substituted aromatic compound, (b) an alpha,beta-ethylenically unsaturated nitrile, and (c) a halogen-substituted ethylenically unsaturated non-aromatic hydrocarbon, the halogen content of the ternary copolymer being at least 15% by weight.

It is known that tough plastic compositions can be obtained by the blending of a styrene-acrylonitrile copolymer with a butadiene-acrylonitrile rubber or elastromeric copolymer. Various suggestions have been made for improving the properties of such blends. Among these is the blending of the styrene-acrylonitrile copolymer with two butadiene-acrylontrile rubbers of different acrylonitrile contents or with a butadiene-acrylonitrile rubber in conjunction with a natural rubber, a polybutadiene, a styrene-butadienec rubber or an acrylate rubber. Pretreatment of the rubber component in various ways, e.g. by hot milling, has also been suggested. The compositions produced by these known methods are highly inflammable.

It is therefore an object of the invention to provide a new class of improved plastic products. It is a further object to provide new plastic products of the kind comprising a diolefin-acrylic nitrile rubber. It is a further object to provide new plastic products containing a butadiene-acrylonitrile rubber having reduced inflammability. It is a further object to provide a new plastic product made up of blends of different copolymers. Other objects and advantages of the invention will be apparent from the following detailed description thereof.

It has now been discovered that these and other objects may be accomplished by the compositions of the invention comprising a blend of 10 to 40 parts of an elastomer comprising a diolefin-acrylic nitrile copolymer with 60 to 90 parts of a ternary copolymer of (a) an alkenyl-substituted aromatic compound, (b) an alpha,beta-ethylenically unsaturated nitrile, and (c) a halogen-substituted ethylenically unsaturated non-aromatic hydrocarbon, the halogen content of the ternary copolymer being at least 15% by weight. It has been found that these particular compositions are strong and tough and have surprisingly good flame resistance. Evidence of these superior properties is shown in the examples at the end of the specification.

The elastomer used in the preparation of the novel compositions of the present invention include the elastomeric copolymers of a diolefin and an acrylic nitrile. The preferred diolefins are the aliphatic conjugated diolefins having 4 to 6 carbon atoms, such as butadiene, isoprene, methyl pentadiene, dimethyl butadiene and the like. The acrylic nitrile is preferably acrylonitrile. The diolefin preferably makes up at least 40% and more preferably 60% to 80% of the copolymer. These copolymers preferably have molecular weights varying from about 5,000 to 500,000 as determined by the light scattering technique described in Chem. Rev., vol. 40, page 319 (1948). Molecular weight may be controlled by the conventional use of chain transfer agents, such as isopropyl alcohol. The elastomeric copolymers may be prepared by any conventional method. Preferred methods of preparation are described in U.S. 2,556,851 and U.S. 2,618,626.

Other elastomers may be used in combination with the above-described diolefin-acrylic nitrile copolymer. This includes natural rubber as well as other synthetic rubbers, such as butadiene-styrene copolymers which are manufactured commercially under such names as GR-S 1000, GR-S 1500, GR-S 1600, GR-S 2000, GR-S 2101 and the like, as well as rubbery copolymers of butadiene and methyl methacrylate, 3,4-dichloro-alpha-methylstyrene, methyl isopropenyl ketone, vinyl pyridine and other related unsaturated monomers. Other synthetic rubbers include the neoprene rubbers, i.e. rubbers prepared from chloroprene, such as those known commercially as GR-M, Neoprene Type Gn, Neoprene Type E, Neoprene FR and the like. Isobutylene rubbers, such as those known in industry as GR-1 rubbers, are also useful. These dissimilar elastomeric materials are preferably used to replace a minor portion of the diolefin-acrylic nitrile rubber and preferably from 1% to about 40% of the diolefin-acrylic nitrile rubber.

The ternary copolymers used in the preparation of the compositions of the invention are those obtained by the copolymerization of (a) an alkenyl-substituted aromatic compound, (b) an alpha,beta-ethylenically unsaturated nitrile, and (c) a halogen-substituted ethylenically unsaturated non-aromatic hydrocarbon. The alkenyl-substituted aromatic compounds are those having an alkenyl group, and preferably a CH$_2$=C< group, attached directly to an aromatic ring, such as styrene, alpha-methylstyrene, vinylnaphthalene, dimethylstyrene, vinyl toluene, 3,4-diethylstyrene, and the like. CH$_2$=C< substituted aromatic compounds from 8 to 16 carbon atoms, and especially styrene, are particularly preferred.

The alpha,beta-ethylenically unsaturated nitriles used in preparing the ternary copolymers are preferably those of the formula

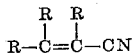

wherein R may be hydrogen or hydrocarbon, and preferably an aliphatic hydrocarbon radical, such as acrylonitrile, alpha-ethyl acrylonitrile, beta-ethyl acrylonitrile, alpha-hexyl acrylonitrile, methacrylonitrile, alpha-cyclohexyl acrylonitrile and the like. Nitriles of the above formula wherein R is hydrogen or alkyl radicals containing from 1 to 4 carbon atoms are particularly preferred.

The third monomer used in making the ternary copolymer is a halogen-substituted ethylenically unsaturated non-aromatic hydrocarbon, and preferably a chlorine-substituted unsaturated aliphatic or cycloaliphatic hydrocarbon containing up to 8 carbon atoms, such as vinyl chloride, vinylidene chloride, 2-chloropropene-1, 2,3-dichloropropene-1, 3,4-dichlorovinyl cyclohexane and 3,4-dichlorovinyl cyclopentane, and the mixtures thereof. Vinyl chloride and vinylidene chloride are particularly preferred.

The ternary copolymers used in preparing the compositions of the invention possess a halogen content of at least 15% by weight. The outstanding flame resistance is obtained wherein the copolymer has the above monomers in the following proportions:

|   | Percent by weight |
|---|---|
| (a) Alkenyl-substituted aromatic compound | 50 to 60 |
| (b) Alpha,beta-unsaturated nitrile | 15 to 25 |
| (c) Halogen-substituted unsaturated hydrocarbon | 25 to 35 |

Preferably, the copolymer contains (a) in 50% to 55% by weight, (b) in 20% to 25% by weight and (c) in 30% to 35% by weight.

The molecular weight of the ternary copolymers preferably varies from 5,000 to 250,000 as determined by the light scattering technique. The molecular weight can be controlled by conventional means as control of temperature and use of solvents and chain transfer agents.

The ternary copolymers may be prepared by any suitable method. They may be prepared, for example, by heating the monomers in a suitable medium in the presence of a polymerization catalyst. They may be prepared in bulk, solvent solution or aqueous suspension or emulsion systems, but are more preferably prepared in an aqueous emulsion using any of the conventional emulsifying agents, such as, for example, soaps, like sodium and potassium myristate, laurate, palmitate, oleate, stearate, rosinate, or alkali metal alkyl or alkylene sulfates or sulfonates, such as sodium and potassium lauryl sulfate, sulfonated Turkey red oil, sulfonated mineral oils, etc. Ordinarily, about 2% to 5% of the emulsifying agent or mixtures thereof in the aqueous phase are suitable.

Polymerization initiators that are particularly suited for use in preparing the ternary polymers include various free-radical yielding catalysts as peroxide catalyst, such as, for example, benzoyl peroxide, lauroyl peroxide, tertiary butyl hydroperoxide, 2,2-bis-(tertiary butyl peroxy) butane, di(tertiarybutyl) peroxide, tertiary butyl perlargonate, hydrogen peroxide, sodium, potassium or ammonium persulfate, percarbonate, peracetic acid, and the like. Other suitable catalysts include azo compounds, such as alpha,alpha-azodiisobutyronitrile and the like. In general, the amount of initiator added will vary from 0.1% to 5% by weight of the material being polymerized. Preferred amounts vary from 0.1% to 2% by weight.

As the three monomers selected may have different polymerization rates, the proportions in which they enter the copolymer molecule may differ from the proportions in which they occur in the reaction mixture. It will be necessary, therefore, to determine beforehand the ratio of concentrations of monomers needed to give copolymers having the three monomers in the above-noted ratios. This can be easily accomplished by conducting a few routine runs and examining the composition of the resulting copolymer. The initial concentration of monomers can then be adjusted so as to give the copolymer of the desired composition.

As the reaction progresses, the monomer concentration ratios may change due to the difference in the rate of polymerization and, in some cases, the ratio will change so that it will be producing copolymers having the above-described ratio. This can be corrected by adjusting the ratio of monomer concentrations during the course of the polymerization by adding more of one, two or all three of the monomers.

The temperature selected for the copolymerization will vary depending chiefly on the type of polymerization catalyst selected, the desired rate of reaction and the molecular weight desired. Generally, the temperature will range from about 15° C. to 200° C. and more preferably from 20° C. to 150° C.

The polymerization may be conducted in the presence or absence of air. In some cases, it has been found desirable to conduct the polymerization in the presence of an inert gas, such as nitrogen. Atmospheric, reduced or superatmospheric pressures may be used as desired.

At the end of the polymerization, the ternary copolymers may be separated from the reaction mixture, or as in the case of emulsions systems, the emulsion may be maintained and used as such in the preparation of the blends as noted hereinafter. In case of bulk or solvent polymerization, the unreacted monomers and/or solvent are preferably removed by distillation or precipitation with appropriate means, and the recovered copolymer then used in the formation of the blends.

The blending of the ternary copolymer with the diolefin acrylic nitrile elastomer, and, if present, other elastomers, may be carried out by mechanical means, e.g. by the use of a two-roll mill or a Bridge Banbury mixer. The milling may be done at room temperature at elevated temperatures. The components may also be pretreated for example, as by hot milling.

Blending may also take place by mixing latices of the ternary copolymer and the elastomer or elastomers and then coagulating or drying the mixed latex. The coagulation of the latices may be accomplished by conventional means, such as by addition of alcohols, acids, salts, and the like.

Stabilizers, pigments and other additives may be incorporated in the compositions of the invention in known fashion.

The inflammability of the compositions of the invention may be still further reduced by the incorporation of antimony trioxide ($Sb_2O_3$) in amounts approximately equivalent to the chlorine present ($Sb_2O_3$) or equivalent to 6 chlorine atoms.

The compositions of the invention possess the desirable physical properties of similar compositions formed with a binary styrene-acrylonitrile copolymer, but also possess the advantage of reduced inflammability. They are ethers particularly suited for use in making molded articles where heat and fire resistance is a highly desirable property. They may be used in making molded articles for electrical equipment, as well as in the manufacture of articles for household appliances, toys and the like.

The invention is illustrated by the following examples in which "parts" are parts by weight.

*Example I*

This example illustrates the preparation and some of the properties of a composition prepared from a copolymer of butadiene and acrylonitrile and a ternary copolymer of styrene, acrylonitrile and vinylidene chloride.

50 parts of styrene, 20 parts of acrylonitrile, and 30 parts of vinylidene chloride were combined with 225 parts of water, 5 parts of sodium dinonyl sulfo succinate, 0.66 part sodium dihydrogen phosphate, 0.5 part ammonium persulfate and 0.4 part ammonium bisulfite. This mixture was stirred under nitrogen at 20° C. for about 5 hours. The resulting emulsion was steam distilled and 2 parts of vinylidene chloride monomer were recovered. The solids content of the emulsion was approximately 30°.

100 parts of the above emulsion was mixed with 18.7 parts of Hycar 1561 (a commercial butadiene-acrylonitrile rubber latex of 40% solids content). The copolymer contains 60–65% butadiene and has a molecular weight between 175,000 to 200,000. The mixture was then spray-dried. The ratio of ternary copolymer:rubber in the blend was 80:20.

Moldings made from this blend were extremely tough and showed reduced inflammability compared to those made from a similarly prepared blend based on 80 parts of 75:25 styrene:acrylonitrile binary copolymer and 20 parts of the same butadiene-acrylonitrile rubber.

The inflammability of the blend based on the ternary copolymer was further reduced by compounding 100 parts of the blend with 10 parts antimony trioxide on a hot two-roll mill.

Related results are obtained by replacing the vinylidene chloride in the above process with an equivalent amount of each of the following: vinyl chloride, 2-chloropropene-1, allyl chloride, and 1-vinyl-2-chlorocyclohexane.

Example II 100 parts of the emulsion of the ternary copolymer of styrene-acrylonitrile-vinylidene chloride prepared in Example I is mixed with 20 parts of an aqueous rubber latex of 40% solids containing 60 parts of a 60-butadiene-40-acrylonitrile copolymer and 40 parts of a 44% styrene-56%-butadiene copolymer. The mixture is spray dried. The molding made from this blend is very tough and shows reduced inflammability compared to those made from a similarly prepared blend based on 80 parts of 75:25 styrene:acrylonitrile binary copolymer and 20 parts of the same mixture of rubber latices.

Related results are obtained by replacing the ternary copolymer of styrene-acrylonitrile-vinylidene chloride with one prepared from styrene-acrylonitrile-vinyl chloride.

Example III

An emulsion of a ternary copolymer containing 60 parts styrene, 15 parts acrylonitrile and 25 parts vinylidene chloride is prepared as shown in Example I. The emulsion has a solids content of 30%.

100 parts of the emulsion of the above ternary copolymer is mixed with 20 parts of an aqueous rubber latex of 40% solids containing 60 parts of a 70%-butadiene-30%-acrylonitrile copolymer and 40% natural rubber latex. The mixture is spray dried. The molding made from this blend is very tough and shows reduced inflammability compared to those made from a similarly prepared blend based on 80 parts of the styrene:acrylonitrile binary copolymer and 20 parts of the same elastomer latex mixture.

The invention claimed is:

1. A plastic composition consisting of a blend of 10 to 40 parts of a rubbery copolymer of a conjugated diolefin and acrylonitrile with 60 to 90 parts of a ternary copolymer of (a) 50% to 60% by weight of an alkenyl-substituted aromatic compound of the group consisting of styrene, alpha-methyl styrene, vinylnaphthalene, dimethylstyrene, vinyl toluene, and 3,4-dimethylstyrene, (b) 15% to 25% by weight of an alpha,beta-ethylenically unsaturated nitrile of the formula

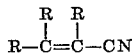

wherein R is a member of the group consisting of hydrogen and alkyl radicals containing from 1 to 4 carbon atoms, and (c) from 25% to 35% by weight of a chlorine-substituted monoethylenically unsaturated non-aromatic hydrocarbon containing up to 8 carbon atoms, the chlorine content of the ternary copolymer being at least 15% by weight.

2. A plastic composition consisting of a blend of 10 to 40 parts of a butadiene-acrylonitrile copolymer with 60 to 90 parts of a ternary copolymer of (a) 50% to 60% by weight of an alkenyl-substituted aromatic compound of the group consisting of styrene, alpha-methyl styrene, vinyl naphthalene, dimethylstyrene, vinyl toluene, and 3,4-dimethylstyrene, (b) 15% to 25% by weight of an alpha,beta-ethylenically unsaturated nitrile of the formula

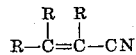

wherein R is a member of the group consisting of hydrogen and alkyl radicals containing from 1 to 4 carbon atoms, and (c) 25% to 35% by weight of a chlorine-substituted monoethylenically unsaturated aliphatic hydrocarbon containing up to 8 carbon atoms.

3. A plastic composition as in claim 2 wherein the halogen-containing monomer is vinyl chloride.

4. A plastic composition as in claim 2 wherein the halogen-containing monomer is vinylidene chloride.

5. A plastic composition as in claim 2 wherein the alkenyl-substituted aromatic compound is styrene.

6. A plastic composition as in claim 2 wherein the unsaturated nitrile is acrylonitrile.

7. A composition consisting of a blend of 10 to 40 parts of a butadiene-acrylonitrile copolymer containing at least 40% butadiene in polymerized form with from 60 to 90 parts of a ternary copolymer of (a) 50% to 60% by weight of styrene, (b) 15% to 25% by weight of acrylonitrile and (c) 25% to 35% by weight of vinylidene chloride.

8. A process for preparing a plastic composition having improved flame resistance which consists of mechanically blending from 10 to 40 parts of a rubbery copolymer of a conjugated diolefin and acrylonitrile with 60 to 90 parts of a ternary copolymer of (a) an alkenyl-substituted aromatic compound of the group consisting of styrene, alpha-methyl styrene, vinylnaphthalene, dimethylstyrene, vinyl toluene, and 3,4-dimethylstyrene, (b) an alpha,beta-ethylenically unsaturated nitrile of the formula

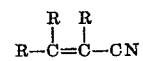

wherein R is a member of the group consisting of hydrogen and alkyl radicals containing from 1 to 4 carbon atoms, and (c) a chlorine-substituted monoethylenically unsaturated non-aromatic hydrocarbon containing up to 8 carbon atoms, wherein the chlorine content of the ternary copolymer is at least 15% by weight.

9. A process as in claim 8 wherein the mechanical blending is accomplished by milling.

10. A process as in claim 8 wherein the blending is accomplished by spray drying a mixture of emulsions of the two copolymers.

References Cited in the file of this patent

UNITED STATES PATENTS

| | | |
|---|---|---|
| 2,614,093 | Wheelock | Oct. 14, 1952 |
| 2,807,603 | Parks et al. | Sept. 24, 1957 |